United States Patent Office 2,758,226
Patented Aug. 7, 1956

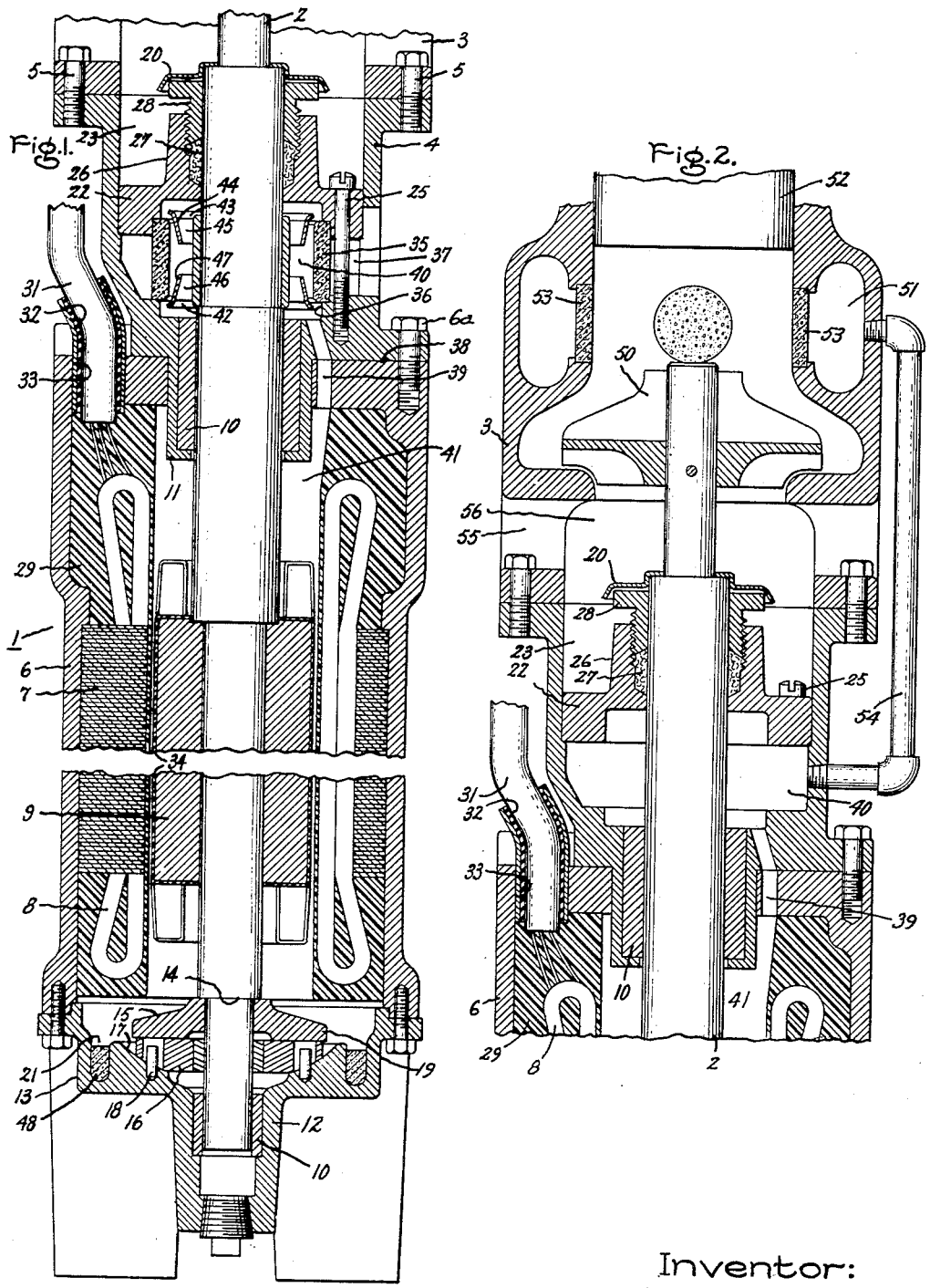

2,758,226

SUBMERSIBLE MOTOR

Alec Fisher, Lynn, Mass., assignor to General Electric Company, a corporation of New York Application August 28, 1953, Serial No. 377,144

2 Claims. (Cl. 310—87)

This invention relates to dynamoelectric machines and more particularly to such machines which are adapted to drive a pump while submerged in a liquid, and has special reference to such machines submerged in water.

In certain pumping applications, it is desirable to position the pump impeller and its driving motor adjacent the bottom of the well casing. In this type of installation the motor is generally arranged below the pump and is therefore surrounded by the liquid in the well which may be water or some other liquid containing dirt, fine sand, and other deleterious substances which must be kept from the interior of the motor because of their harmful effects upon the bearings and other parts of the motor. It is therefore necessary in designing a motor for this type of application to provide a sealing arrangement for preventing the well liquid carrying these harmful substances from entering the motor. Heretofore complicated seals have been utilized around the motor shaft where it projects from the motor casing. However, the best of these seals are subject to wear through contact with the gritty material suspended in the well liquid so that the well liquid ultimately enters the interior of the motor. Other designs have utilized oil filled motor casings. In this type of motor difficulties have been encountered due to the expansion and contraction of the oil and also due to the increased temperature of the motor during operation as well as the loss of oil leaking past the seals. Such leakage necessitates removing the motor from the bottom of the well to replenish its oil periodically.

It is therefore desirable to provide a submersible motor construction having means providing for the entry of well lquid into the motor in a manner that will not harmfully affect the operation of the motor.

It is therefore an object of this invention to provide improved submersible motor construction in which the ambient liquid in which the motor is submerged has access to the interior of the motor casing and wherein the well liquid or any deleterious substances carried by it do not adversely affect the operation of the motor.

Another object of this invention is to provide an improved submersible motor construction wherein the ambient liquid in which the motor is submerged has access to the interior of the motor casing and in which means are provided for preventing the entry into the motor casing of solid materials carried by the well liquid.

Further objects and advantages of this invention will become apparent and this invention will be better understood by reference to the following description and the accompanying drawing and the features of novelty which characterize this invention will be pointed out with particularity in the claims annexed to and forming part of this specification.

In accordance with one aspect of this invention there is provided a motor casing to define a cavity in which a rotor and stator are placed. One end of the rotor shaft extends out of the cavity and a tightly fitted seal is provided mounted on the casing and surrounding the shaft to prevent the entrance of well liquid into the cavity between the shaft and the seal. A porous filter is provided in an opening in the casing to provide for the entry of well liquid into the interior of the motor casing with the filter serving to remove the gritty substances from the well liquid and preventing their entry into the interior of the motor casing. Means are provided for increasing the pressure of the liquid in the casing in a region adjacent the shaft seal to a level higher than the pressure outside the motor casing thereby causing any leakage past the shaft seal to be the filtered well liquid moving from the inside to the outside of the motor casing while at the same time drawing liquid through the filter into the casing. The rotor laminations are preferably coated with a material characterized by low absorption of the well liquid. The stator and its associated windings may be protected from contact with the well liquid by a cast or molded plastic material which surrounds and fills the winding end turns and slots. If desired, means such as a hard grease in cake form which is impregnated with copper sulfate may be placed in the motor casing to assist in the lubrication of the bearings and in preventing bacterial growth from forming in the well liquid inside the motor casing.

In the drawing,

Fig. 1 is a side sectional view illustrating the improved submersible motor construction of this invention;

Fig. 2 is a fragmentary sectional view illustrating an alternative motor construction embodying this invention.

Referring now to Fig. 1, there is shown a submersible pump motor generally identified as 1, it being understood that the motor 1 will generally be vertically arranged in a well casing below the pumping element (not shown) which is driven by shaft 2. Impeller housing 3 which is shown in fragmentary form may be secured to motor bearing support housing 4 by any suitable means, as for example studs 5.

The motor 1 is provided with a cylindrical housing 6 to which bearing support housing 4 is secured by suitable means such as studs 6a. Non-rotatably secured to casing 6 is an annular laminated stator 7 having suitable field windings 8 arranged in winding slots thereof. Rotor 9 shown here as being of the squirrel cage induction type is positioned within the bore of stator 7 and is mounted on shaft 2.

Shaft 2 is rotatably mounted in suitable bearings 10 which are in turn positioned in central hubs 11 and 12 of bearing support housings 4 and 13, respectively. Bearings 10 may be made of any material suitable for lubrication by the well liquid in which the motor is submerged. Where the well liquid is water, bearings 10 are preferably made of materials such as stellite, carboloy, textolite, nylon, bakelite, wood, rubber, etc.

Shaft 2 is provided at its lower end with an undercut portion providing shoulder 14. Surrounding shaft 2 and abutting shoulder 14 there is provided an annular thrust collar 15 to counteract the axial thrust of the pumping operation. Thrust collar 15 is arranged to engage lower bearing 16 which is formed of any material suitable for lubrication by the well liquid. While any suitable thrust bearing may be used, bearing 16 is illustrated as a ball seat type bearing which is supported on a cooperating spherical surface 17 in the motor casing. This construction serves to assure the proper alignment between bearing members 16 and thrust collar 15. Bearing member 16 may be secured against rotation relative to bearing housing 13 by means of pins 18 which loosely engage suitable holes in bearing 16.

To protect the bearing surface of bearing 16 from the small amount of grit or other contaminates which may be carried by the liquid within the motor housing, a thrust collar 15 is provided with a slightly greater diameter than bearing 16 so that it provides a portion 19 which overlies the outer periphery of bearing 16 to deflect any such contaminates away from the bearing and into an annular groove 21 formed in the bearing housing 13 which serves as a receptacle for such solid contaminates which may gain entrance into the motor casing.

In order to prevent gritty material and other contaminates carried by the well liquid from entering the upper bearing 10 of the bearing housing 4 by falling downwardly along shaft 2, a seal member is provided. Seal member 22 disposed axially above upper bearing 10 between upper bearing 10 and the cavity 23 in the impeller housing 3, which contains unfiltered well liquid, will serve this purpose. A seal member 22 closely fits the inner periphery of bearing housing 4 and is secured thereto by any suitable means such as bolts 25.

Seal member 22 is provided with a hub portion 26 having a central bore spaced radially outwardly from shaft 2 to define an annular cavity with shaft 2 into which a suitable packing material 27 is placed. Packing nut 28 threadedly engages the central bore of hub 26 to compress packing material 27 to provide a close seal with respect to shaft 2.

The rotatable deflector 20 mounted on shaft 2 above seal member 22 protects the packing material 27 by deflecting the heavy particles carired by the well fluid in cavity 23 away from shaft 2.

Because this invention contemplates that the well liquid will have access to the interior of the motor casing and hence will come in contact with the laminated magnetic cores 7 and 9 of the stator and rotor, respectively, as well as the stator windings 8, means may be provided for preventing the possible harmful effects of such contact. Referring again to Fig. 1, stator 7, after being secured in position in casing 6, is molded into place by casting or molding a material 29 characterized by low absorption of well liquid to surround and fill the winding and the windings slots. While any suitable material may be used, where the machine will be submarged in water, the use of an epoxy Thiokol blend of filling compound for this purpose is preferable because water does not cause this compound to swell up. It will be observed in Fig. 1 that a thin coating of this material covers the inner bore of the stator laminations thereby preventing corrosion of the stator laminations within the casing. Lead cable 31 is likewise sealed with respect to casing 1 by means of a coating or filling 32 which seals cable 31 with respect to the opening 33 in casing 6.

In order to prevent the corrosion of the laminated rotor 9 where the motor is for use submerged in water, there is likewise provided means to prevent the contact of the water with the rotor laminations. While any suitable coating or plating can be used, the use of a modified epoxy sprayed on the surfaces of the rotor and baked to form a waterproof and abrasion resistant layer 34 on the rotor and to hermetically seal the rotor with respect to shaft 2 is preferred.

There will now be described the means whereby this invention provides for the liquid in which the motor is submersed has access to the interior of the motor while eliminating the harmful effects of abrasive substances and other contaminates carried by the liquid on the bearings and other parts of the motor.

Referring again to Fig. 1, there is shown positioned within housing 4 an annular ring 35 of suitable material for filtering out the gritty substances and other contaminates from the well liquid prior to their entry into the motor. While annular ring 35 may be formed of any suitable porous filtering material, the use of a sintered bronze or ceramic filter is preferred.

Means are provided for securing the filter in position as, for example, clamping filter 35 between seal member 22 and an annular shoulder 36 on the lower wall of bearing housing 4.

In order to permit the well liquid surrounding the motor to enter the motor casing, openings 37 are provided in the bearing housing 4 surrounding the filter 35. Communication means between annular cavity 40 and the cavity 41 are provided. In the illustrated embodiment, end wall 38 of the motor casing is perforated as at 39 to accomplish this purpose. Thus it will be seen that filter 35 will serve to separate out gritty materials and other contaminates from the well liquid thereby preventing substantially all such materials from entering the motor.

With this construction alone however, a certain amount of well liquid would also enter between shaft 2 and packing material 27 since it is extremely difficult to make this seal completely leakproof. The well liquid entering by this means would carry with it gritty materials and other contaminates.

In order to prevent this, it is essential that the pressure of the liquid within the motor casing be increased to a level higher than the pressure of the well liquid in cavity 23. Means are provided to accomplish this result.

Positioned in the cavity 40 between the filter 35 and the shaft 2 is an auxiliary pump secured to shaft 2 and having an impeller 43. Impeller 43 is provided with a tapered shroud 44 and a plurality of radial vanes 45. Impeller 43 tends to create a lower pressure in the cavity 40 to draw the well liquid through filter 35 into the motor casing in the region above the impeller 43 to pressurize the liquid in the motor adjacent the seal 22 thereby to cause any flow of liquid between seal member 22 and the shaft 2 to be outwardly from the motor casing. It will be noted that the seal member 22 is provided with a recess in its lower end just above the impeller 43, in which recess or region an increased pressure is created by the impeller 43. If desired, a second impeller 42 as shown having a plurality of radial vanes 46 surrounded by an annular shroud 47 may be provided to pressurize the cavity 41.

It is apparent that any leakage between the interior and the exterior of the motor casing will be in an outward direction and the entrance of well liquid into the motor casing except through filter 35 is prohibited.

Because the leakage from the motor casing will be slight, the well liquid in the motor casing may tend to become stagnated and the temperature rise of the well liquid due to the operation of the motor will encourage bacterial growth within the motor casing when the well liquid is water. Since this bacterial growth may result in a formation of slime, it may be desirable to provide means to reduce this tendency for producing slime inside the motor enclosure.

While any suitable means may be used, the use of a slime prevention substance such as copper sulfate is preferred. An annular cake 48 of hard grease impregnated with copper sulfate positioned in annular recess 21 at the bottom of the motor casing may be used. Such a cake is gradually consumed during the operation of the motor. The grease is desirable because it assists in the lubrication of the bearings of the motor.

Referring now to Fig. 2, I have shown a modified construction which provides for the utilization of filtered well liquid in the motor casing under pressure to prevent the leakage of unfiltered well liquid into the motor casing. In Fig. 2 corresponding parts are indicated by similar reference numerals to those used in Fig. 1. The motor casing 6 encloses the windings 8 embedded in material 29. The shaft 2 on which the rotor is mounted is rotatably supported in bearing 10 and extends axially upwardly past seal member 22 as has heretofore been described in connection with Fig. 1. The main impeller unit of the pump 50 is enclosed in a housing 3. The impeller housing 3 is provided with a cavity 51 on the output side of the main impeller 50. Separating cavity 51 and the outlet pipe 52 of the pump is filter 53. A pipe 54 provides means for communication between cavity 51 and chamber 40 within the motor casing. Means such as perforations 39 provide communication between chamber 40 and chamber 41 in which the rotor and stator of the motor are positioned. When the impeller 50 is operating, it is apparent that it will pressurize the liquid within chamber 40. Further, since the pressure of the liquid within the motor casing is greater than it is in the area surrounding the motor casing, any other leakage out of the motor casing will likewise be in an outward direction.

From the foregoing it will be seen that this invention provides an improved submersible motor construction wherein means are provided for introducing filtered well liquid into the motor casing under sufficient pressure to prevent any leakage of well liquid containing grit or other solid contaminates into the motor casing and thereby eliminate the harmful effects of such foreign matter on the operation of the motor.

While there is shown and described a specific embodiment of this invention, further modifications thereof will occur to those skilled in the art. It is desired, therefore, that it be understood that this invention is not limited to the form shown and it is intended in the appended claims to cover all modifications which do not depart from the spirit or scope of this invention.

What I claim as new and desire to secure by Letters Patent of the United States is:

1. A submersible electric motor structure adapted for use in a well containing a liquid carrying solid substances in suspension comprising a casing defining a cavity therein, a stator member mounted in said cavity, a cooperating rotor member mounted on a shaft in said cavity, said shaft extending through said casing, means for sealing said shaft with respect to said casing, said casing having an opening formed therein for establishing communication between the interior and exterior thereof to permit the entrance of liquid into said casing for circulation through said motor, filtering means positioned in said opening for preventing said suspended substances from entering said casing, and an impeller on said shaft having its inlet connected with the filtered liquid in said motor and its outlet positioned adjacent said sealing means for discharging the filtered liquid thereaganist at a pressure in excess of that appearing exteriorly of said casing.

2. A submersible motor adapted for use submerged in a well liquid containing solid particles in suspension comprising a casing containing a motor having a shaft arranged for connection to a pump located exteriorly of said casing, an inlet in a wall of said casing provided with a filtering element for permittnig ingress of liquid into the confines of said motor, a centrally apertured partition plate in an end of said casing constructed to receive said shaft and packing glands therefor for preventing flow of unfiltered liquid into said casing, and an auxiliary pump mounted on said shaft within said casing and having its inlet connected with the filtered liquid in said motor and its outlet located in axial alignment with said packing glands for discharging liquid thereagainst under a pressure greater than the pressure outside said casing to thereby prevent entry of unfiltered liquid into said casing during operation of said motor.

References Cited in the file of this patent

UNITED STATES PATENTS

| 1,610,726 | Arutunoff | Dec. 14, 1926 |
| 1,955,955 | Fabrin | Apr. 24, 1934 |
| 2,002,913 | Mendenhall et al. | May 28, 1935 |

FOREIGN PATENTS

| 423,689 | Great Britain | Feb. 6, 1935 |
| 727,813 | Germany | Nov. 12, 1942 |
| 739,971 | Germany | Oct. 8, 1943 |